Aug. 11, 1970 J. P. PRITCHARD, JR., ET AL 3,524,165
DYNAMIC FAULT TOLERANT INFORMATION PROCESSING SYSTEM
Filed June 13, 1968
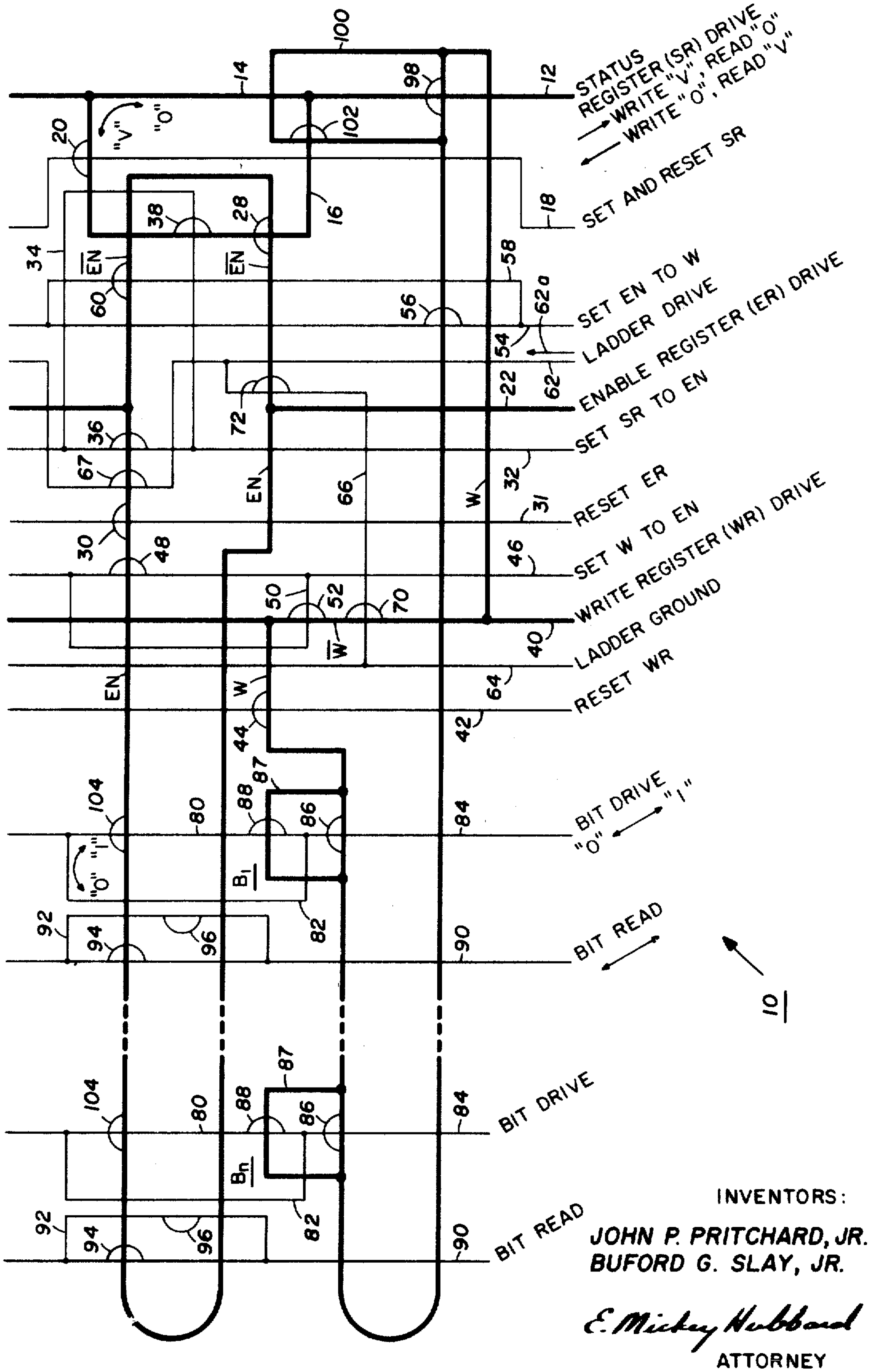
INVENTORS:
JOHN P. PRITCHARD, JR.
BUFORD G. SLAY, JR.
E. Mickey Hubbard
ATTORNEY United States Patent Office 3,524,165

Patented Aug. 11, 1970

3,524,165

DYNAMIC FAULT TOLERANT INFORMATION PROCESSING SYSTEM

John P. Pritchard, Jr., and Buford G. Slay, Jr., Richardson, Tex., assignors to Texas Instruments Incorporated, Dallas, Tex., a corporation of Delaware Filed June 13, 1968, Ser. No. 736,630
Int. Cl. G06f *11/00, 13/08*
U.S. Cl. 340—146.1 5 Claims

ABSTRACT OF THE DISCLOSURE

An associatively organized cryogenic information processing system having a plurality of identical words, each word having a predetermined number of storage bits and a plurality of controlled registers, each register having one bit for each word. Each bit of one of the control registers, termed the status register, has three stable states. One of the states is a ground state which exists in the event of failure of that bit in the status register so that the status register will detect failure of its own bit. The failure modes of the remainder of the system are controlled such that the failure of any part of any word results in the corresponding bit of the status register reverting to the ground state. During operation, those words identified by the status register as being failed are excluded from use.

This invention relates generally to information processing systems, and more particularly, but not by way of limitation, relates to an information processing system and method for operating the system when one or more component parts of the system has failed.

The trend in device technology for information processing applications has been toward increasing the number of interconnected elements within a single unit of manufacture, which is generally termed an array. Whether using semiconductor, magnetic or superconductor technology, the cost of fabrication of the arrays appears to be primarily related to the number of units processed, rather than to the number of elements per unit. It is economically desirable, therefore, to make the arrays as large and the component density as high as practical. The failure statistics of the individual elements in the integrated arrays, however, tend to be the same as those of the discrete elements. Thus, as the array becomes more complex, perfection in fabrication is an unrealistic goal, irrespective of the circuit function served. This necessitates, as a practical matter, the utilization of arrays containing some failed elements. The most common approach to this problem involves interconnecting only the unfailed elements in a given array at an intermediate stage of array fabrication. In semiconductor array technology, this approach is generally referred to as discretionary wiring, and has been given wide consideration. In this approach, each element, typically a circuit which performs a logic function, is tested in situ on the semiconductor slice. The operative elements are then interconnected by custom designed second and third level lead systems. While this approach has many advantages, a computer is required to generate the custom mask of discretionary wiring, and more importantly, no provision is made for defects occuring in the interconnection system, and during the subsequent operational life of the system.

This invention is concerned with an information processing system which is tolerant of elements that become defective either during fabrication, or during the useful life of the system. The system includes a plurality of units each adapted to function when one or more of the other units has failed. A storage control or lockout means comprising an "operative" state and a "failure" state is provided as an integral part of each unit of the system. The storage control means automatically reverts to its "failure" state in the event of either its own failure or of failure of any element in its corresponding memory means. In its "failure" state it prevents operation of the entire unit of which it is a part. As may readily be seen, all other units of the system can be successively tested and any defective element in respective units will switch the lockout storage control means therefor to the failed state and prevent operation of the entire unit of which the element is a part.

More specifically, a cryogenic data processor is provided with a register which utilizes the absence of stored current as the failed state, and requires the presence of stored current to enable the remainder of the system. In accordance with another aspect of the invention, the register is also used to indicate when a word in the memory is occupied or vacant by the direction of the stored current.

The novel features believed characteristic of this invention are set forth in the appended claims. The invention itself, however, as well as other objects and advantages thereof, may best be understood by reference to the following detailed description of illustrative embodiments, when read in conjunction with the accompanying drawing, wherein:

The figure is a simplified schematic circuit diagram of an associatively organized cryogenic data processor which utilizes the features and method of this invention.

Referring now to the drawing, a data processing system in accordance with the present invention is indicated generally by the reference numeral 10 in the figure. The data processing system is a cryogenic system of the type described in U.S. Pat. No. 3,350,698, issued Oct. 31, 1967; U.S. Pat. No. 3,366,519, issued Jan. 30, 1968; U.S. Pat. No. 3,318,790, issued May 9, 1967; and U.S. applications Ser. No. 423,734, filed Jan. 6, 1965, now U.S. Pat. No. 3,321,346 and entitled "Process for Fabricating Cryogenic Devices"; Ser. No. 411,253, filed Nov. 16, 1964, now U.S. Pat. No. 3,391,024 and entitled "Process for Preparing Improved Cryogenic Circuits"; Ser. No. 423,815, filed Jan. 6, 1965, now U.S. Pat. No. 3,409,466 and entitled "Process for Electrolessly Plating Lead on Copper"; Ser. No. 606,132, filed Dec. 30, 1966, now abandoned and entitled "Cryogenic Data Processing System With Disconnectable Memory Arrays"; Ser. No. 517,009, filed Dec. 28, 1965, now abandoned and entitled "Cryotron"; and Ser. No. 606,200, filed Dec. 30, 1966 and entitled "Improved Method for Manufacturing Multi-Layer Film Circuits," all of which are assigned to the assignee of the present invention.

The portion of the system 10 illustrated is comprised of a single word having two storage bits $B_1$ and $B_n$, together with the necessary control circuitry to the right-hand side of the storage bits. An associatively organized system includes any number of such words and control circuitry together with the associated circuits for providing drive currents in the desired sequence and sensing the presence or absence of voltages as required.

The control circuity includes a status register which is formed by a drive line 12 and a series of storage loops, each formed by a high inductance path 14 and a low inductance path 16. As will hereafter be described in greater detail, each of the bits formed by a storage loop has three states, namely, a failed state when no current is stored in the loop, a vacant state when stored current is circulating in the loop in a clockwise direction, and an occupied state when stored current is circulating in a counterclockwise direction. The latter two states are abritrarily selected. All bits in the status register can be reset to the failed state by pulsating line 18 so as to switch the cryotron 20 in the low inductance loop 16 resistive, thus dissipating any circulating current. Current can be stored by pulsing line 18 while current is flowing through drive line 12 to switch the current through the high inductance branch 14. Then when the drive current is terminated, current will be stored in the loop in a direction dependent upon the direction of the drive current.

An enable register ER is formed by a direct current drive line 22 which is continuously supplied with a D.C. current, a not enable branch $\overline{EN}$, and an enable branch EN. The enable register is operated in flip-flop manner, current being continually present in one branch or the other. As will hereafter be described in greater detail, a word is operative only when current is in the EN branch, and current can be switched to the EN branch only when current is stored in the status register. The enable register also serves as a match register and as the read enable register as will presently be described.

Current may be switched from the not enable branch $\overline{EN}$ to the enable branch EN of the enable register if the current stored in the loop of the status register adds with the read current supplied on status register drive line 12. Only in such a case is cryotron 28 switched resistive. Croytron 28 is designed to require two units of current before it is switched resistive and is not switched resistive by either the drive current or the stored current acting alone.

The enable register may be reset so that current flows in the not enable branch $\overline{EN}$ at all storage positions by pulsing line 31 to switch cryotron 30 resistive.

The status register can be set to the enable register by pulsing line 32 while current is flowing in drive line 12 of the status register. As a result of current in the EN branch, cryotron 36 will be resistive and the current will be directed through branch 34, which in turn will switch cryotron 38 resistive. This will divert current through the high inductance branch 14 so that when the drive current through line 12 is terminated, current will be stored in a direction dependent upon the direction of the drive current in line 12.

A write register WR is formed by a drive line 40, which is divided into a write branch W and a not write branch $\overline{W}$ at each word position. Current is always supplied through drive line 40 and current is always in one of the loops W or $\overline{W}$. The write register can be reset so that current flows only in the $\overline{W}$ branches by pulsing line 42. thus switching cryotron 44 resistive. The write register can be set to the enable register by pulsing line 46. If current is in the EN branch, cryotron 48 will then be switched resistive, and current will be switched through branch 50 of drive line 46, thus switching cryotron 52 resistive and switching current from the $\overline{W}$ branch to the W branch. Conversely, the enable register ER can be set to the write register WR at each word position where current is in the W branch of the write register by pulsing line 54. The current in the W branch of the write register will then switch cryotron 56 resistive, causing the current in drive line 54 to pass through branch 58 and switch cryotron 60 resistive, thus switching the current through drive line 22 of the enable register from the $\overline{EN}$ branch to the EN branch of the enable register.

Current may be sequentially switched from the $\overline{W}$ to the W branches of the write register by a ladder system including a ladder drive line 62, a ladder ground line 64, and an interconnecting branch 66 at each word position. In operation, D.C. current is supplied in the direction of arrow **62*a* on drive line 62. At the first word position where current is in the EN branch of the enable register, the current is switched through branch 66 to the ground line 64 by cryotron 67, thus switching current from the $\overline{W}$ branch of the write register WR to the W branch by switching cryotron 70 resistive. It will be noted that if current is in the $\overline{EN}$ branch of the enable ladder, current cannot pass through branch 66 because cryotron 72** will be switched resistive.

As illustrated, the word has two bit positions $B_1$ and $B_n$, each formed by branches 80 and 82 in bit drive lines 84. Of course, it will be appreciated that any number of bit positions may be provided, fifty being a typical number.

Current can be selectively written into the bit positions of each word where current is in the W branch of the write register by applying current of the appropriate polarity to the respective bit drive lines 84. This switches the cryotron 86 in branch W at the respective bit position resistive so that current in the W branch flows through a high inductance loop 87 to switch cryotron 88 in the bit drive line 84 resistive. This diverts current through the high inductance branch 82. When current in the bit drive line 84 is discontinued, current is trapped in the storage loop formed by branches 80 and 82.

The logic number stored in the respective bit positions of a word identified by current in the EN branch can be read out by providing a D.C. current on bit read line 90 and sensing whether the bit read line 90 is resistive or superconductive. If the current stored in the bit loop is additive with the current in the read line shunt 92, which results from cryotron 94 being switched resistive by current in branch EN, cryotron 96 will be switched resistive. If the currents do not add, the cryotron 96 will remain superconductive.

The status register can also be set to either occupied or vacant status from the W branch of the write register merely by pulsing status register drive line 12 with the appropriate polarity current. Then at each word where current is in the W branch, cryotron 98 will be switched resistive to shunt current through path 100 and switch cryotron 102 resistive. This dissipates any previously stored current in the status register bit and directs the drive line current through the high inductance branch 14. When the current is terminated, a circulating current of the appropriate polarity is trapped in the status register bit.

The bits in memory which contain a particular logic number can be ascertained by setting the enable register ER to the EN state at the words to be considered and applying a current to the appropriate bit drive line 84 of the appropriate polarity. Thus, if the words in which a logic "1" is stored in bit $B_1$ are to be identified, a logic "1" current is applied to the drive line 84 for bit $B_1$. In those bits where a logic "1" is stored, the currents in branch 80 will be opposed, cryotron 104 will remain superconductive, and current will remain in branch EN. However, in those bits where a logic "0" is stored, the currents will add and switch cryotron 104 resistive, which will switch the enable register current back to branch $\overline{EN}$.

A simple associatively organized cryogenic data processing system may typically comprise a number of arrays each containing all the logic, memory, and register control functions for each of forty words, where each word contains fifty associative storage cells or bits. Each array includes in excess of 10,000 cryotron devices with superconductive interconnection paths a minimum of 25.4 micrometers wide, all of which are formed by six layers of material, each nominally one micrometer thick, which are suitably patterned to provide the required structure. Such a system typically has over one hundred signal paths, such as the bit drive lines, bit sense lines, control register drive lines, and various control lines, which extend through all words in memory. These lines are commonly referred to as global current paths. The yield of individual elements in these arrays is typically in excess of 99.9 percent. However, this high yield is meaningless for arrays having large numbers of individual devices, since one failed device in a word renders the entire word inoperative, and the yield of arrays having no failed words approaches zero. Thus, operation of a system in a fault tolerant mode is essential.

There are basically three failure models for the associative cryogenic data processor: short circuit, open circuit, and inferior gain or trapped current levels. The fault tolerant system of the present invention accommodates the latter two failure modes as will presently be described in detail, but does not accommodate short circuits. However, short circuits can be essentially eliminated.

Short circuit failures can be of either interlayer and intralayer origin. Interlayer shorts result primarily from pinholes in the opaque emulsions of the patterning photomask which are reproduced in the photo-resist polymer intended as interlayer insulation. This source of short circuits can be virtually eliminated by double application of each polymeric insulation layer, while individually patterning each layer with a separate photomask.

Another major cause of interlayer short circuits results from the use of the plasma discharge to improve adhesion of each metal deposition following exposure of the substrate to room ambient. The high energy electrons appear to be capable of penetrating the polymer insulation, whereas the positive ions are stopped. This results in a charge buildup between the insulated and ungrounded prior metallization and the positive surface charge is sufficient to cause dielectric breakdown of the insulated layer. The void produced by the breakdown then results in an interlayer short circuit between the previous and subsequent metal layers. This problem is overcome by providing low resistance charge paths during the plasma discharge cleaning step which are subsequently removed.

A source of intralayer shorts results from microscopic particles accumulating on the photomask surface used to pattern the metal film layers. This results in the retention of unintended metal bridges between adjacent signal paths. This accumulation can be eliminated by a double photographic process using separate photomask copies prior to each metal etch, since the location of the microscopic particles on the two masks are statistically uncorrelated.

As a result of these procedures, a completed array may typically exhibit fewer than twenty interlayer short circuits at the possible 100,000 insulated crossovers. Intralayer short circuits are typically observed in only ten percent of the arrays. These short circuits are, in general, of filamentary nature and thus can be volatilized by concentrating the current discharged from a capacitor in the filament. This procedure is carried out with the arrays at a superconductive temperature of 3.5° K. in order to minimize the likelihood of open-circuiting the intended signal path segments leading to the short circuit site. These techniques essentially eliminate short circuits as a failure mode.

The next criteria for operating the associative system in the fault tolerant mode is that all global signal paths be continuous. For example, driven lines 12, 22, and 40 for the status register SR, enable register ER and write register WR must be continuous through all arrays in memory. However, only branches 14, $\overline{EN}$, and $\overline{W}$ need be continuous. Branches 16, EN, and W can be open at any particular word without rendering the entire array inoperative. In addition, all control lines, bit drive lines, and bit sense lines must be continuous, although the memory can be operated with shorter word lengths if desired in the event of failure of a global line asociated with a storage bit.

Reliable operation in the dynamic fault tolerant mode is dependent upon the fact that the status register SR automatically switches to the failed state in the event of its own failure. As previously mentioned, the drive line 12 must be continuously superconductive through each array and through the entire memory. The inability to store current in a particular loop or bit of the status register indicates that the bit has failed. The presence of a stored current indicates that the loop has not failed, and the direction of the stored current may be used to represent the fact that the word is vacant when circulated in the clockwise direction and that the word is occupied when circulating in the counterclockwise direction. The use of any particular word is dependent upon the ability to switch current from the $\overline{EN}$ branch to the EN branch of the enable register. This can be done only if a current is stored in the loop of the status register and this current adds with additional current supplied to the drive line 12 in the branch 16 so as to switch cryotron 28 resistive.

A typical procedure to establish dynamic fault tolerant operation would commence by first pulsing reset lines 18, 31, and 42 to dissipate any stored current in the status register SR, and switch the currents in the enable register ER and write register WR to the $\overline{EN}$ and $\overline{W}$ branches, respectively. If any one of the drive lines 12, 22, or 40 becomes resistive during the period that the reset lines are pulsed, this is an indication that the respective branch 14, $\overline{EN}$ or $\overline{W}$ is open at some bit and that the array is, therefore, inoperative. The currents through reset lines 18, 31, and 42 are then terminated.

Next, the current through drive line 12 is terminated, resulting in a current being stored in the operative bits of the status register in a direction determined by the polarity of the current applied to drive line 12, typically in the vacant direction "V." The current through drive line 12 is then reversed so that the stored current and the portion of the current through the low inductance branch 16 add to switch cryotron 28 in the $\overline{EN}$ branch resistive at those words where a current was successfully stored in the status register bit, but only at those bits. This switches the current from branch $\overline{EN}$ to branch EN only at those bits.

The status register may then be reset by pulsing line 18 to dissipate all stored currents and then set to the enable register by pulsing line 32. At those words where current was successfully switched to branch EN, cryotron 36 will be switched resistive to shunt current through branch 34 and switch cryotron 38 resistive. Current of the appropriate polarity is then applied through drive line 12 before current through line 32 is terminated so that the current will be switched through the high inductance branch 14. Then when current through drive line 12 is terminated, current will again be stored in the status register bits where current is in branch EN.

The enable register ER is again reset by pulsing line 31, then once again set to the status register SR by pulsing drive line 12 in the appropriate direction to switch cryotron 28 resistive. The write register is then set to the enable register by pulsing line 46. At each word where cryotron 48 is switched resistive by current in branch EN, the current on line 46 will pass through shunt 50 and switch cryotron 52 in the $\overline{W}$ branch resistive, thus switching the current from the $\overline{W}$ branch to the W branch.

The enable register is then first reset by pulsing line 31 so that all currents are switched to branches $\overline{EN}$, then set to the write register WR by pulsing line 54. At those words where current is in branch W, cryotron 56 will be switched resistive, current will be diverted through shunt path 58 to switch cryotron 60 resistive, and current will be switched from branch $\overline{EN}$ to branch EN of the enable register.

The write register WR is then again reset by pulsing line 42, and the write register WR once again set to the enable register ER by pulsing line 46. The status register SR is then again reset by pulsing line 18 to dissipate all currents stored therein. Current of the appropriate polarity, typically in the vacant direction "V," is then applied to the status register drive line 12 so that at those words where current is in branch W, cryotron 98 is switched resistive. Current is thereby directed through shunt branch 100 to switch cryotron 102 resistive, thus switching the drive current through the high inductance branch 14. Then when current through the drive line 12 is terminated, a circulating current will be trapped in those bit positions where current was in the W branch.

The foregoing procedure results in current being stored in the status register only at those words where all parts of the status register, the enable register and the write register, including the circutry for setting the enable register to the status register, for setting the write register to the enable register, for setting the enable register to the write register, and for setting the status register to the write register, are operative. In the event of failure of any of this circuitry at any word position, no current can be stored in that bit of the associated status register.

The operation of the storage bits B may then be checked out, in parallel, by first resetting both the enable register ER and write register WR, setting the enable register ER to the status register SR and the write register WR to the enable register ER. All operative words at this stage of the check out procedure are then identified by current in branch W of the write register WR. A logic "0" may then be stored in all bits of all operative words identified by current in branch W by pulsing the bit drive lines 84 with current of the appropriate polarity. Then all words are checked, one bit at a time, in the following manner: A pulse of current representative of a logic "1" is applied to the bit drive line 84. If a logic "0" was successfully stored in the corresponding bit, the stored current and the current on the bit drive line will add and switch cryotron 104 resistive, thus switching the current from branch EN to branch $\overline{EN}$ at all operative words. Line 32 may then be pulsed to dissipate the current stored in the status register SR at all words where current remains in branch EN. The enable register ER is then again set to the status register SR by pulsing drive line 12 in the appropriate direction, and the sequence repeated on each successive bit drive line. The procedure can then be repeated by storing all logic "1's" in those words which are still identified by storing current in the status register, and repeating the sequential procedure, bit by bit, by successively applying current pulses representative of logic "0's" to the bit drive lines 84 and then striking the stored current from the status register SR at any failed word. This latter procedure may be eliminated since the ability to store current in one direction in a bit storage loop will normally indicate that current can be stored in the opposite direction.

Next, the enable register ER and write register WR are reset, and the enable register ER set to the status register SR. Current is then supplied to ladder drive line 62 in the direction of arrow 62*a*. At the first word in memory where current is in branch EN, cryotron 36 will be switched resistive and current will be directed through shunt path 66 to ground line 64, switching cryotron 70 resistive and switching current from branch $\overline{W}$ to branch W to identify a single word in memory. Logic "1's" can then be stored in all bits of the single word by pulsing bit drive lines 84 in the appropriate direction. The ability to read logic "1's" stored by pulsing the bit lines in the proper direction can then be checked by applying current in the appropriate direction to bit read lines 90 and detecting resistivity of the read lines as a result of both cryotrons 94 and 96 being switched resistive by current in the corresponding branch EN and the addition of current in branches 92 and 82, respectviely. Logic "0's" can then be stored in all bits and the ability to read logic "0's" similarly checked. If any one of the bits fails in either check, the enable register ER can be reset by pulsing line 31, then set to the write register WR by pulsing line 54, then the current stores in the corresponding bit of the status register SR dissipated by pulsing line 32. The enable register ER is then first reset, then once again set to the status register SR, the next successive potentially operative word in the memory identified by operation of the ladder, and the procedure repeated.

If the word is not failed at any bit, a unique addressing number, or other data, may be stored in the word and the status register set from vacant "V" to occupied "O" status by pulsing status drive line 12 in a direction to write occupied. This switches cryotrons 98 and 102 resistive, dissipating the previously stored current representing a vacant status, and stores a new current in the opposite direction indicating that the word is now occupied. The enable register is again reset by pulsing line 31 before being set to the vacant status of the status register, and the procedure repeated to identify and check out the next potentially operative word.

By using the above procedure, only those words which are totally operative can be used. Any word which has failed in any particular is identified by the absence of a stored current in the status register. Such a word can never be used because current can never be transferred from branch EN to branch EN. The procedure can be used to initially test each array and determine the number of operative words in the array. If the array does not have an acceptable number of operative words, the array can be discarded. The same procedure can be used before a system is used in order to compensate for any failures which may have occurred at any time prior to the check out procedure.

The status register also functions as an occupancy register to indicate those operative words which are presently filled with useful data, and those words which are vacant and can be filled with useful data. In the processing of information, those words which are filled with useful data can be identified by pulsing status register drive line 12 with current in the direction to read occupied, so that the enable register will be set to the occupied status of the status register. Search, write, or read functions can then be performed on all words so identified, either in the parallel or serial mode.

Although the method of the present invention has been described in connection with a unique associatively organized cryogenic data processing system, it is to be understood that the concept is broadly applicable to, and can be embodied in, other data processing systems. It is also to be understood that various changes, substitutions and alterations can be made in the above-described embodiments of the invention without departing from the spirit and scope of the invention.

What is claimed is:

1. In an information processing system, the combination of:

- a plurality of units each comprising memory means, each of said units being adapted to function when one or more of the other units has failed to maintain at least partial useful operation of the system,
- storage control means as a part of each unit having at least two stable logic states for indicating its own failure, one of said states representing a failure state to which the storage control means automatically switches in the event of its own failure, and
- means coupling each storage control means to its respective memory means to switch said storage control means to the failure state in the event of failure of the respective memory means to thereby prevent use of the respective unit.

2. The combination set forth in claim 1 wherein the storage control means comprises a cryogenic storage loop, and the two states are the presence of stored current representing an operative state and the absence of stored current representing a failed state.

3. The combination defined in claim 2 wherein a plurality of the units and their associated storage control means constitute a cryogenic data processing system.

4. The combination defined in claim 2 wherein the means coupling each storage control means to the respective memory means includes:

- a cryogenic flip-flop which can be set to an enable state only by current stored in the storage control means, and from which the storage control means can be set to the operative state.

5. The method for operating a data processor having a plurality of units each adapted to function when one or more of the other units has failed in order to maintain at least partial useful operation of the system, each unit comprising a status register and a storage memory means, the status register having a failed state to which it automatically reverts in the event of failure of the unit, and an operative state, which method consists of the steps of:

setting the status register to the operative state to identify those units of the system having an operative status register, checking only those units thus identified as having an operative status register to determine which of that group of units has operative storage memory means, then setting the respective status registers to identify only the operative units, and utilizing only those units thus identified as operative, the failure mode of the status register automatically excluding use of defective units.

References Cited

UNITED STATES PATENTS

| | | | |
|---|---|---|---|
| 2,950,464 | 8/1960 | Hinton | 340—146.1 X |
| 3,402,399 | 9/1968 | Bragg | 340—173.1 |
| 3,402,400 | 9/1968 | Sass | 340—173.1 |
| 3,427,599 | 2/1969 | McKeever | 340—173.1 |

TERRELL W. FEARS, Primary Examiner

H. L. BERNSTEIN, Assistant Examiner

U.S. Cl. X.R.

340—172.5, 173.1; 307—219